United States Patent
Zhang et al.

(10) Patent No.: US 9,182,217 B2
(45) Date of Patent: Nov. 10, 2015

(54) METHOD FOR MEASURING DISPLACEMENT OF LARGE-RANGE MOVING PLATFORM

(71) Applicant: TSINGHUA UNIVERSITY, Beijing (CN)

(72) Inventors: Ming Zhang, Beijing (CN); Yu Zhu, Beijing (CN); Hao Liu, Beijing (CN); Yi Jiang, Beijing (CN); Zhao Liu, Beijing (CN); Kaiming Yang, Beijing (CN); Jinchun Hu, Beijing (CN); Dengfeng Xu, Beijing (CN); Haihua Mu, Beijing (CN); Wensheng Yin, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/396,714

(22) PCT Filed: Apr. 10, 2013

(86) PCT No.: PCT/CN2013/073993
§ 371 (c)(1),
(2) Date: Oct. 23, 2014

(87) PCT Pub. No.: WO2013/159645
PCT Pub. Date: Oct. 31, 2013

(65) Prior Publication Data
US 2015/0085302 A1    Mar. 26, 2015

(30) Foreign Application Priority Data
Apr. 23, 2012 (CN) .......................... 2012 1 0121975

(51) Int. Cl.
*G01B 11/14* (2006.01)
*G01B 11/04* (2006.01)
*G01D 5/28* (2006.01)

(52) U.S. Cl.
CPC ............... *G01B 11/04* (2013.01); *G01B 11/14* (2013.01); *G01D 5/285* (2013.01)

(58) Field of Classification Search
CPC ........ G01B 11/14; G01B 21/04; G01B 11/04; G01B 11/0616; G01B 11/24; G01B 21/08; G01B 21/10; G01B 21/18; G01B 21/22; G01B 2210/58; G01B 5/12; G01B 5/18; G01B 7/14; G01B 9/0205; G01B 9/02087
See application file for complete search history.

(56) References Cited

U.S. PATENT DOCUMENTS

| 5,770,864 A | * | 6/1998 | Dlugos .................... 250/559.19 |
| 7,612,889 B2 | | 11/2009 | Nakata et al. |
| 2010/0013860 A1 | * | 1/2010 | Mandella et al. ............. 345/650 |

FOREIGN PATENT DOCUMENTS

| CN | 1932650 A | 3/2007 |
| CN | 101038442 A | 9/2007 |

(Continued)

OTHER PUBLICATIONS

Notice of Grant of a Patent Right for an Invention for Chinese application 201210121975.0 dated Jun. 3, 2014.

(Continued)

*Primary Examiner* — Michael P Stafira
(74) *Attorney, Agent, or Firm* — Hauptman Ham, LLP

(57) ABSTRACT

A method for measuring displacement of a large-range moving platform, comprising: arranging multiple beams of first measuring light parallel to one another and generated by an optical path distribution device and a position sensitive detector array in a certain manner, to ensure that at least one beam of first measuring light is detected by the position sensitive detector array when a moving platform is at any position of a moving area; a detection head array capable of determining whether a light beam is shaded being used for auxiliary measurement of a position of the moving platform; and determining a position of the moving platform that corresponds to the first measuring light measured by the position sensitive detector array, to calculate displacement of the moving platform. The method effectively enlarges a measurement range of the position sensitive detector array, and implements measurement of long range displacement of the moving platform.

5 Claims, 3 Drawing Sheets

(56) References Cited

FOREIGN PATENT DOCUMENTS

| | | |
|---|---|---|
| CN | 102410836 A | 4/2012 |
| CN | 102661709 A | 9/2012 |
| JP | H10-153410 A | 6/1998 |
| JP | 2011-149849 A | 8/2011 |

OTHER PUBLICATIONS

Chinese Office Action for application 201210121975.0 dated Nov. 27, 2013.
International Search Report mailed Jul. 18, 2013 for PCT/CN2013/073993.
Written Opinion for PCT/CN2013/073993 dated Jul. 18, 2013.

* cited by examiner

METHOD FOR MEASURING DISPLACEMENT OF LARGE-RANGE MOVING PLATFORM

CROSS REFERENCE TO RELATED APPLICATION

This application claims the priority of Chinese Patent Application No. 201210121975.0, filed on Apr. 23, 2012 in the Chinese Intellectual Property Office. Further, this application is the National Phase application of International Application No. PCT/CN2013/073993 filed on Apr. 10, 2013, which designates the United States and was published in Chinese.

FIELD OF THE INVENTION

The present invention relates to a measuring scheme, and particularly to a large-range displacement measuring device with an array of position sensitive detectors.

BACKGROUND

A position sensitive detector (PSD: Position Sensitive Detector) is a PIN-type photodiode sensitive to the position of a light spot from the light incident to a photosensitive surface, which photo sensitive detector is consisted of a P layer, an I layer and a N layer by a planar diffusion manufacturing process and is sensitive to an incident light in the two directions perpendicular to the plane of the detector. It is widely used in a non-contact laser displacement detecting system owing to its advantages of a high resolution, good applicability, quick response speed and simple circuit structure in the subsequent processes.

The PSD and CCD are widely used in motion control systems with preciseness of micrometers, and by each of the PSD and CCD, a six-degree-of-freedom displacement of the moving platform is calculated with multiple measurements. They both have advantages and disadvantages. In contrast, the PSD has the advantages of a high resolution, simple circuit structure in the subsequent process, quick response speed and no dead zone, and the disadvantages of poor linearity and limited measurement range. Regarding accuracy and real-time performance, the PSD is more promising.

The range of a moving platform is limited due to the limited measurement range of PSD. Therefore, in a large-range moving system, other displacement sensors (electric eddy current sensors and grating ruler, etc.) are cooperatively used for measurement to improve the measurement range of the PSD measuring system and increase the moving range of the moving platform. However, different types of measuring elements may increase the difficulties of signal communicating and processing.

SUMMARY

To overcome the problem where the range of a moving platform is limited by the PSD measurement range in the existing applications, the present invention provides a PSD array measuring scheme capable of measuring displacement of a large-range moving platform.

To achieve the above-mentioned object, the scheme of the present invention is described as follows:

a method for measuring displacement of a large-range moving platform, characterized in that, the method comprising: an optical path distribution device is fixed on the moving platform and the optical path distribution device is configured to generate multiple beams of first measuring light parallel to one another, in which these beams of first measuring light are parallel to the horizontal surface; multiple position sensitive detectors are formed into a linear array and fixed on a base platform, in which the working surface of the position sensitive detectors is perpendicular to the horizontal surface of the base platform.

The multiple beams of first measuring light and the linear array of position sensitive detectors are arranged in such a manner that at least one beam of first measuring light is detected by the linear array of position sensitive detectors when the moving platform is within a moving area, wherein the arranging manner being is calculated as follows:

$$k \geq \frac{\tau_d}{d}$$

when the beams of first measuring light are arranged in unequal spacing and the position sensitive detectors are arranged in equal spacing, given that the spacing between the adjacent position sensitive detectors is $\tau_p$, the number of beams of the first measuring light is m, and the measurement range of the position sensitive detector is d, then:

$$m \geq \frac{\tau_p}{d}$$

A linear array formed of multiple pairs of detection headers is fixed on the base platform, the multiple pairs of detection headers are configured for emitting multiple beams of second measuring light parallel to one another, in which the linear array formed of the detection headers is configured for detecting whether the second measuring light is shaded by the moving platform to obtain a rough position of the moving platform according to the shaded situation of the beams of second measuring light distributed within the moving area of the moving platform.

The array of position sensitive detectors and the linear array of detection headers are arranged along a same direction at the same time, and the large-range displacement of the moving platform in the direction is calculated according to the measurements of the position sensitive detectors and the rough position of the moving platform obtained by the detection headers, in which the calculating is as follows:

given that the moving platform performs linear motion along the y-direction; at the same time, the first measuring light is detected by the $n^{th}$ position sensitive detector of the array of position sensitive detectors, in which, the coordinates of the measuring origin of the $n^{th}$ position sensitive detector is $(x_0, y_0, z_0)$ in respect to the coordinate system of the base platform, and the coordinates of the detected beam of first measuring light is $(0, y_1, z_1)$ in respect to the measuring origin of the $n^{th}$ position sensitive detector; the spacing between the adjacent detection headers is $\tau_\omega$, and $\omega$ beams of light are shaded by the array of detection headers, with the coordinate in the y-direction of the center of the $\omega$ pairs of detection headers being $y_\omega$, and the mass center of the moving platform which is at its centroid is l in length; then, the position error of the mass center of the moving platform measured by the detection headers is $$\pm \frac{l - \omega \cdot \tau_\omega}{2},$$

and the relative position in the y-direction of the detected beam of first measuring light emitted at the moving platform is $y_0+y_1-y_m$ in respect to the mass center of the moving platform with an error being $$\pm \frac{l-\omega \cdot \tau_\omega}{2};$$

and then, the accurate position of the detected beam of first measuring light and its relative position in respect to the mass center of the moving platform can be determined in connection with the fixing position of the optical path distribution device; given that the position in respect to the mass center is $(x_r, y_r, z_r)$, then the displacement of the moving platform in the y-direction is $y_0+y_1-y_r$.

A method for measuring multiple-degrees-of-freedom displacement of a large-range moving platform, using the one-dimensional linear displacement measuring method for the moving platform, the one-dimensional linear displacement measuring devices formed by the array of position sensitive detectors and the array of detection headers are arranged at two directions respectively to calculate multiple-degrees-of-freedom displacement of the moving platform with the measurements of the position sensitive detectors and the detection headers, in which the calculating is as follows: given that the one-dimensional linear displacement measuring schemes formed by the array of position sensitive detectors and the array of detection headers are arranged in the x-direction and the y-direction respectively surrounding the moving platform, then the large-range displacements of the moving platform in the x-direction and the y-direction are calculated according to the above-mentioned large-range displacement measuring method; the minor displacement in the z-direction of the moving platform can also be measured since one single position sensitive detector is used for minor plane measurement in two dimensions; and at the same time, the displacements in three spinning directions of the moving platform are calculated according to the displacements of the x-direction or the y-direction by each one-dimensional linear displacement measuring scheme and the displacement of the z-direction to perform multiple-degrees-of-freedom measurement.

In one implementation, the optical path distribution device includes: a laser for emitting a beam of measuring light; a plurality of beam splitters formed into a linear array, which is fixed on a surface of the moving platform in a certain spacing ratio; in which, the working surface of each beam splitter is perpendicular to the horizontal surface, all beam splitters are parallel to one another, and the multiple beams of first measuring light are generated by the measuring light emitted from the laser through the linear array of beam splitters.

In another implementation, an optical fiber beam splitter is used as the optical path distribution device, which is fixed on the moving platform and can generate the multiple beams of first measuring light.

The minimal spacing among the array of detection headers is calculated as follows: given that the minimal spacing between the adjacent detection headers is t, the minimal spacing between the beams of first measuring light is p, then t≤p.

The present invention achieves the technical effect of non-contact measurement for large-range displacement of a moving platform through measurement by position sensitive detectors in the industrial fine motion field, which is suitable for a motion control system for fine-motion measuring and can reduce the difficulties of the signal communicating and processing.

BRIEF DESCRIPTION OF DRAWINGS

IN FIGURES 101-moving platform; 102-base platform;
201-optical path distribution device; 202-beam splitter; 203-laser; 204-first measuring light;
301-position sensitive detector;
401-detection header; 402-second measuring light.

DETAILED DESCRIPTION

In the following, the detailed description of the invention will be further described in detail in connection with the accompanying drawings.

There is provided a method for measuring displacement of a large-range moving platform, the measuring method mainly comprising an optical path distribution device 201, a linear array of PSDs 301 and an array of detection headers 401.

Figure 1:
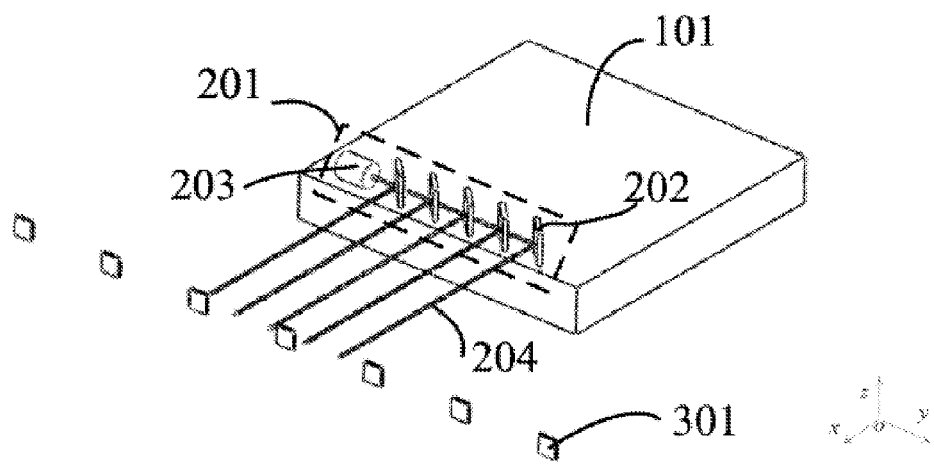
FIG. 1 is a schematic drawing showing the working principle of the array of position sensitive detectors according to the present invention.

As shown in FIG. 1, the optical path distribution device 201 which is configured to generate multiple beams of first measuring light 204 parallel to one another is fixed on the moving platform 101, in which the beams of first measuring light 204 are parallel to the horizontal surface; a plurality of position sensitive detectors 301 are formed into a linear array and fixed on the base platform 102, in which the working surface of the position sensitive detectors 301 is perpendicular to the horizontal surface of the base platform 102; the multiple beams of first measuring light 204 and the linear array of position sensitive detectors 301 are arranged in such a manner that at least one beam of first measuring light 204 is detected by the linear array of position sensitive detectors 301 when the moving platform 101 is within the moving area, with the arranging manner as follows:

when the beams of first measuring light 204 are arranged in equal spacing and the position sensitive detectors 301 are arranged periodically, given that the spacing between the adjacent beams of first measuring light 204 is $\tau_d$, the number of the beams of first measuring light 204 is m, the number of the position sensitive detectors 301 in each period is k, and the measurement range of the position sensitive detector 301 is d, then:

$$k \geq \frac{\tau_d}{d}$$

when the beams of first measuring light 204 are arranged in unequal spacing and the position sensitive detectors 301 are arranged in equal spacing, given that the spacing between the adjacent position sensitive detectors 301 is $\tau_p$, the number of the beams of first measuring light 204 is m, and the measurement range of the position sensitive detectors 301 is d, then:

$$m \geq \frac{\tau_p}{d}$$

Figure 2:
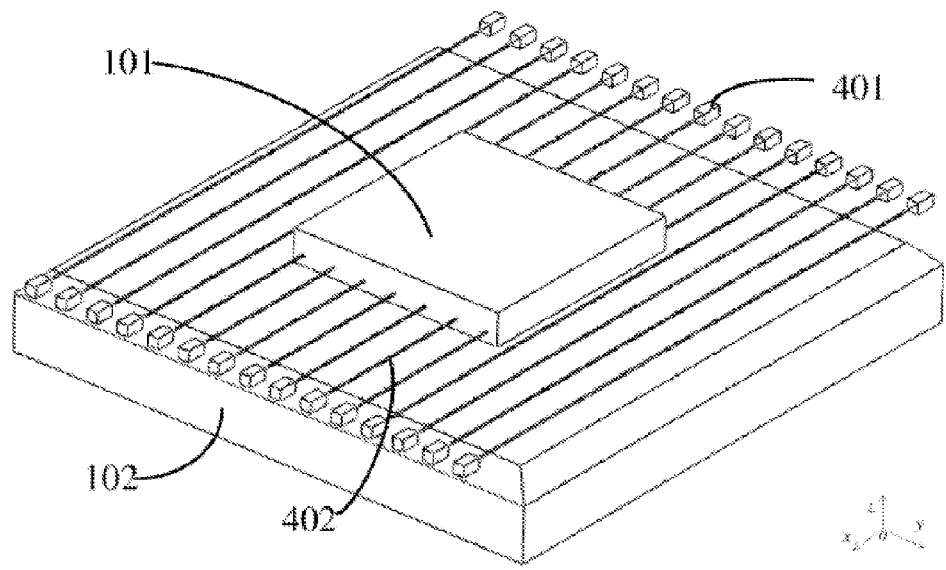
FIG. 2 is a schematic drawing showing the working principle of the array of detection headers according to the present invention.

As shown in FIG. 2, the array of detection headers 401 is fixed on the base platform 102; when it cannot be ensured that at least two beams of first measuring light 204 are detected by the array of PSDs 301 at any position of the moving area of the moving platform 101, at the time the displacement of the moving platform 101 cannot be calculated by only one beam of the first measuring light 204, the type shown in FIG. 2 can be adopted to resolve the above problem. The array of detection headers 401 can emit second measuring light 402 and the array of detection headers 401 can detect whether the beams of second measuring light 402 are shaded. When the beams of second measuring light are distributed in the moving area of the moving platform 101, the rough position of the moving platform 101 can be obtained with the measurements by the array of detection headers 401. When only one beam of the first measuring light 204 is detected by the array of PSDs 301, the corresponding positions of the measured first measuring light 204 and the moving platform 101 can be deduced according to the rough position of the moving platform 101 obtained by the array of detection headers 401 to calculate the accurate displacement of the moving platform 101. The minimal spacing among the array of detection headers 401 is calculated as follows: given that the minimal spacing between each pair of detection headers 401 is t, and the minimal spacing between beams of first measuring light 204 is p, then t≤p.

Figure 3A:
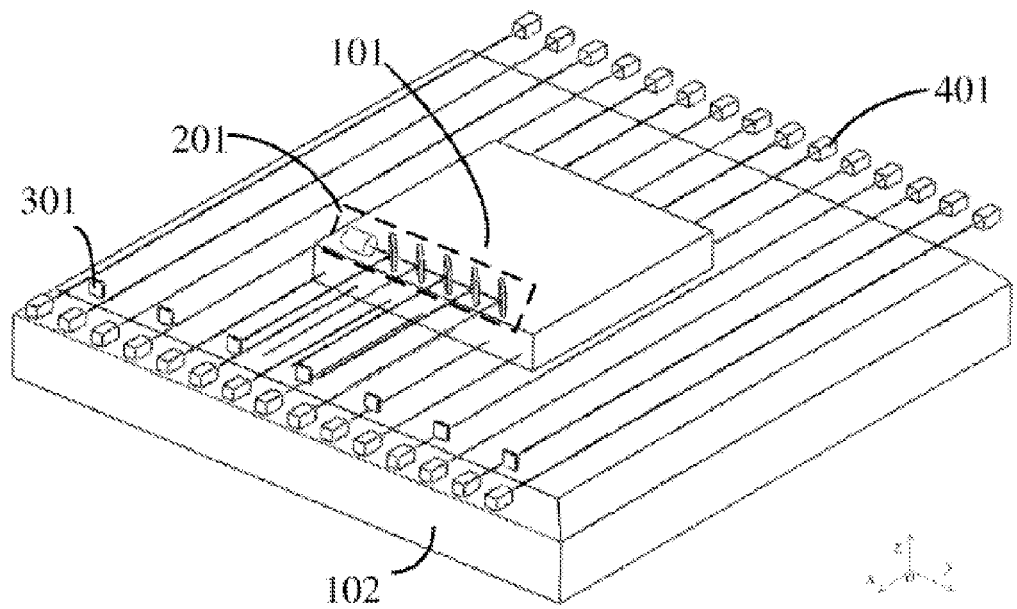
FIG. 3a is a schematic drawing showing the measurement for displacement of a large-range moving platform according to the present invention.

As shown in FIG. 3a, the array of position sensitive detectors 301 and the linear array of detection headers 401 are arranged along a same direction at the same time, and the large-range displacement of the moving platform 101 in the direction is calculated according to the measurements of the position sensitive detectors 301 and the rough position of the moving platform 101 obtained by the detection headers 401, in which the calculating is as follows: given that the moving platform 101 performs linear motion along the y-direction; at the same time, the first measuring light 204 is detected by the $n^{th}$ position sensitive detector of the array of position sensitive detectors 301, in which, the coordinates of the measuring origin of the $n^{th}$ position sensitive detector is $(x_0, y_0, z_0)$ in respect to the coordinate system of the base platform 102, and the coordinates of the detected beam of first measuring light 204 is $(0, y_1, z_1)$ in respect to the measuring origin of the $n^{th}$ position sensitive detector; the spacing between the adjacent detection headers 401 is $\tau_\omega$, and ω beams of light are shaded for the array of detection headers 401, with the coordinate in the y-direction of the center of the ω pairs of detection headers being $y_\omega$, and the mass center of the moving platform 101 which is at its centroid is l in length; then, the position error of the mass center of the moving platform 101 measured by the detection headers 401 is $$\pm \frac{l - \omega \cdot \tau_\omega}{2},$$

and the relative position of the detected first measuring light 204 emitted at the moving platform 101 is $y_0 + y_1 - y_m$ in respect to the mass center of the moving platform 101 in the y-direction with an error being $$\pm \frac{l - \omega \cdot \tau_\omega}{2},$$

and then, the accurate position of the detected beam of first measuring light 204 and its relative position in respect to the mass center of the moving platform 101 can be determined in connection with the fixing position of the optical path distribution device 201; given that the position in respect to the mass center is $(x_r, y_r, z_r)$, then the displacement of the moving platform 101 in the y-direction is $y_0 + y_1 - y_r$.

Figure 3B:
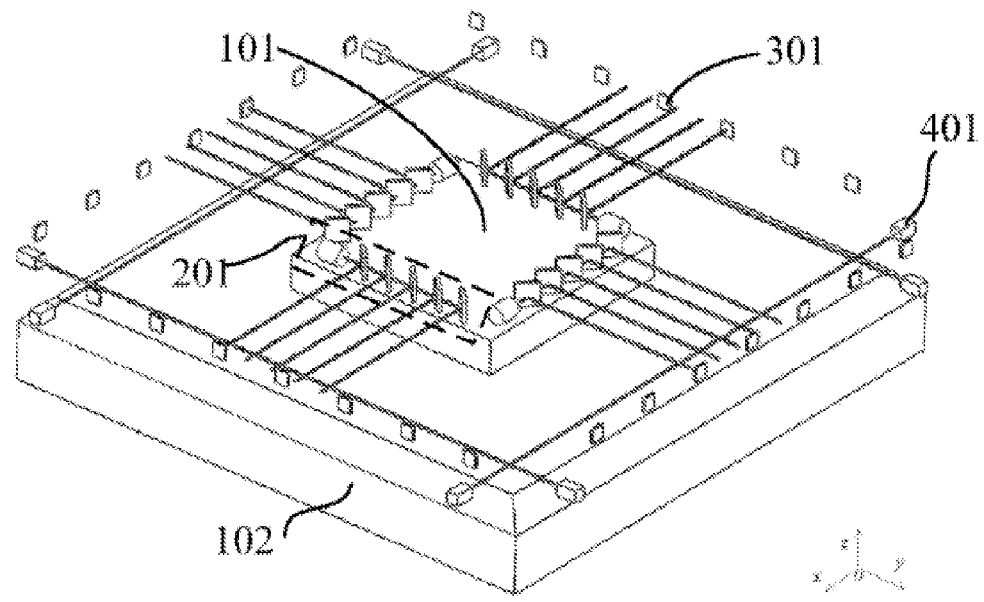
FIG. 3b is a schematic drawing showing multiple-degrees-of-freedom measurement for the moving platform according to the present invention.

As shown in FIG. 3b, using the above-mentioned one-dimensional linear displacement measuring method for the moving platform, the one-dimensional linear displacement measuring devices formed by the array of position sensitive detectors 301 and the array of detection headers 401 are arranged in two directions respectively to calculate multiple-degrees-of-freedom displacement of the moving platform 101 with the measurements of the position sensitive detectors 301 and the detection headers, in which the calculating is as follows: given that the one-dimensional linear displacement measuring schemes formed by the array of position sensitive detectors 301 and the array of detection headers 401 are arranged in the x-direction and the y-direction respectively surrounding the moving platform 101, then the large-range displacements of the moving platform in the x-direction and the y-direction are calculated according to the above-mentioned large-range displacement measuring method; the minor displacement in the z-direction of the moving platform 101 can also be measured since one single position sensitive detector is used for minor plane measurement in two dimensions; and at the same time, the displacements in three spinning directions of the moving platform 101 are calculated according to the displacements of the x-direction or the y-direction by each one-dimensional linear displacement measuring scheme and the displacement of the z-direction to perform multiple-degrees-of-freedom measurement.

Figure 4:
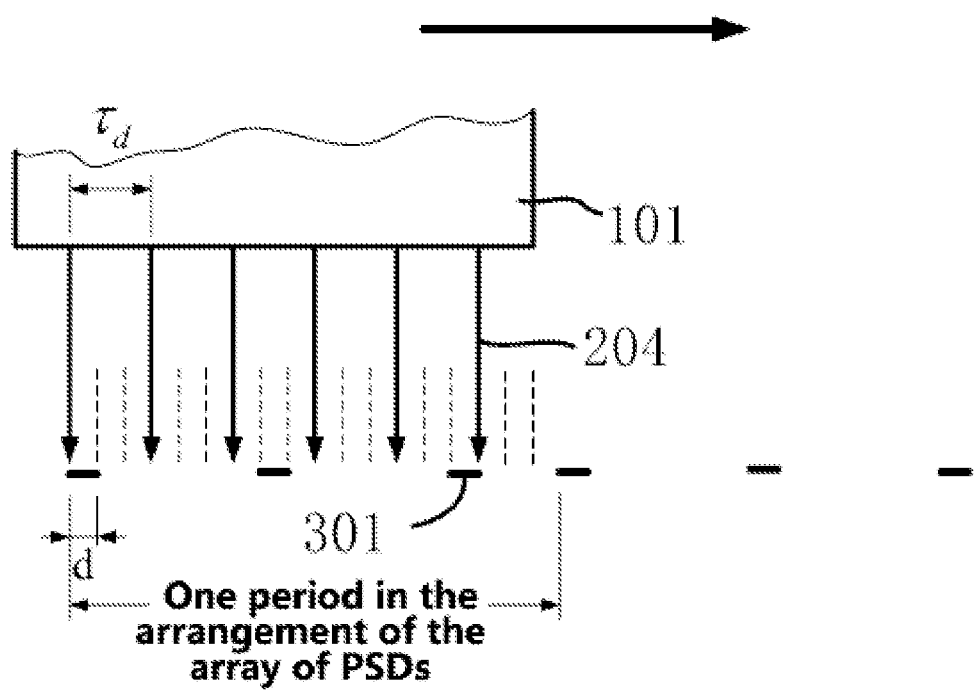
FIG. 4 is a schematic drawing showing an arranging method of the array of position sensitive detectors according to the present invention.

As shown in FIG. 4, there is shown an arranging implementation of the m beam splitters 202 and the n PSDs 301, in which, m=6, the beam splitters 202 are spaced equally from each other and the PSDs are arranged periodically. Select the measurement range of a single PSD as d=10 mm, and the length of the moving platform is 200 mm, that is the spacing between the adjacent beams of first measuring light:

$$\tau_p \leq \frac{l}{m} = \frac{200}{6} = 33.3 \text{ mm}$$

According to the calculating formula, the number of the PSDs in each period can be obtained as follows:

$$k \geq \frac{\tau_d}{d} = \frac{30}{10} = 3$$

That is, the linear array of PSDs 301 is arranged with three PSDs in each period, and this way of arranging can guarantee that at least one beam of the first measuring light 204 can be detected by the linear array of PSDs 301 at any position of the moving area of the moving platform 101. Given that the moving platform 101 moves toward right, in a manner of cyclic displacement, the beams of first measuring light 204 and the PSDs 301 are numbered now from the left to the right as follows: the beams of first measuring light 204 are numbered as $a_1, a_2, a_3, a_4, a_5, a_6$, and the PSDs 301 are numbered as $b_1, b_2, b_3, b_4, b_5, b_6$. When the moving platform 101 is moving toward right, the corresponding relationship between the detected beam of first measuring light 204 and the corresponding PSD 301 detecting the detected beam of first measuring light 204 is as follows:

$(a_1, b_1) \to (a_3, b_2) \to (a_5, b_3) \to (a_6, b_4) \to (a_2, b_2) \to (a_4, b_3) \to (a_5, b_4) \to (a_1, b_2) \to a_3, b_3) \to (a_4, b_4) \to (a_6, b_5) \to (a_2, b_3) \to (a_3, b_3) \to (a_5, b_5) \to (a_1, b_3) \to (a_2, b_4) \to (a_4, b_5) \to (a_6, b_6) \to (a_1, b_4) \to \ldots$ That is, the same cycling process is performed as above. Based on these mentioned above, if the measurement range is required to be increased, then it only needs to add more PSDs and arrange them in the same way as mentioned above.

The preferred embodiments of the present invention are presented in the above but not for limiting the invention. The protecting scope of the present invention should only be defined by the claims.

The invention claimed is:

1. A method for measuring linear displacement of a large-range moving platform, characterized in that, the method comprising:

an optical path distribution device (201) is fixed on the moving platform (101), in which multiple beams of first measuring light (204) parallel to one another are generated by the optical path distribution device (201) and the beams of first measuring light (204) are parallel to the horizontal surface;

a plurality of position sensitive detectors (301) are formed into a linear array and fixed on a base platform (102), in which the working surface of the position sensitive detectors (301) is perpendicular to the horizontal surface of the base platform (102);

the multiple beams of first measuring light (204) and the linear array of position sensitive detectors (301) are arranged in such a manner that at least one beam of first measuring light (204) is detected by the linear array of position sensitive detectors (301) when the moving platform (101) is within a moving area, wherein the arranging manner is calculated as follows:

when the beams of first measuring light (204) are arranged in equal spacing and the position sensitive detectors (301) are arranged periodically, given that the spacing between the adjacent beams of first measuring light (204) is $\tau_d$, the number of the beams of first measuring light (204) is m, the number of the position sensitive detectors (301) in each period is k, and the measurement range of the position sensitive detector (301) is d, then:

$$k \geq \frac{\tau_d}{d}$$

when the beams of first measuring light (204) are arranged in unequal spacing and the position sensitive detectors (301) are arranged in equal spacing, given that the spacing between the adjacent position sensitive detectors (301) is $\tau_p$, the number of the beams of first measuring light (204) is m, and the measurement range of the position sensitive detector (301) is d, then:

$$m \geq \frac{\tau_p}{d};$$

a linear array formed by multiple pairs of detection headers (401) for emitting multiple beams of second measuring light (402) parallel to one another is fixed on the base platform (102), in which the linear array formed by the detection headers (401) is configured for detecting whether the beams of second measuring light are shaded by the moving platform (101) to obtain a rough position of the moving platform (101) according to the shaded situation of the beams of second measuring light distributed within the moving area of the moving platform (101); and the array of position sensitive detectors (301) and the linear array of detection headers (401) are arranged along a same direction at the same time, and the large-range displacement of the moving platform (101) in the direction is calculated according to the measurements of the position sensitive detectors (301) and the rough position of the moving platform (101) obtained by the detection headers (401), in which the calculating is as follows:

given that the moving platform (101) performs linear motion along the y-direction; at the same time, the first measuring light (204) is detected by the $n^{th}$ position sensitive detector of the array of position sensitive detectors (301), in which, the coordinates of the measuring origin of the $n^{th}$ position sensitive detector is $(x_0, y_0, z_0)$ in respect to the coordinate system of the base platform (102), and the coordinates of the detected beam of first measuring light (204) is $(0, y_1, Z_1)$ in respect to the measuring origin of the $n^{th}$ position sensitive detector in the coordinate system of the base platform (102); the spacing between the adjacent detection headers (401) is $\tau_\omega$, and $\omega$ beams of light are shaded in the array of detection headers (401), with the coordinate in the y-direction of the center of the $\omega$pairs of detection headers (401) being $y\omega$, and the mass center of the moving platform (101) which is at its centroid is / in length; then the position error of the mass center of the moving platform (101) measured by the detection headers (401) is $$\pm \frac{l - \omega \cdot \tau_\omega}{2},$$

and the relative position in the y-direction of the detected beam of first measuring light (204) emitted at the moving platform (101) is $y_0 + y_1 - y_m$ in respect to the mass center of the moving platform (101) with an error being $$\pm \frac{l - \omega \cdot \tau_\omega}{2};$$

and then the accurate position of the detected beam of first measuring light (204) and its relative position in respect to the mass center of the moving platform (101) are determined in connection with the fixing position of the optical path distribution device (201); given that the position in respect to the mass center is $(x_r, y_r, z_r)$, then the displacement of the moving platform (101) in the y-direction is $y_0 + y_1 - Y_r$.

2. A method for measuring multiple-degrees-of-freedom displacement of a large-range moving platform, characterized in that, the method comprising:

using the one-dimensional linear displacement measuring method for the moving platform, the one-dimensional linear displacement measuring devices formed by the array of position sensitive detectors (301) and the array of detection headers (401) are arranged at two directions respectively to calculate multiple-degrees-of-freedom displacement of the moving platform (101) with the measurements of the position sensitive detectors (301) and the detection headers (401), in which the calculating is as follows: given that the one-dimensional linear displacement measuring schemes formed by the array of position sensitive detectors (301) and the array of detection headers (401) are arranged in the x-direction and the y-direction respectively surrounding the moving platform (101), then the large-range displacements of the moving platform in the x-direction and the y-direction are calculated according to the above-mentioned large-range displacement measuring method; the minor displacement in the z-direction of the moving platform (101) is also measured since one single position sensitive detector is used for minor plane measurement in two dimensions; and at the same time, the displacements in three spinning directions of the moving platform (101) are calculated according to the displacements of the x-direction or the y-direction by each one-dimensional linear displacement measuring scheme and the displacement of the z-direction, so as to carry out multiple-degrees-of-freedom measurement.

3. The method for measuring linear displacement of a large-range moving platform of claim 1, characterized in that, the optical path distribution device (201) comprising:

a laser (203) for emitting a beam of measuring light; and a plurality of beam splitters (202) formed into a linear array, which is fixed on a surface of the moving platform (101); in which the working surface of each beam splitter (202) is perpendicular to the horizontal surface, and all beam splitters (202) are parallel to one another, and the multiple beams of first measuring light (204) are generated by the measuring light emitted from the laser (203) through the linear array formed by the beam splitters (202).

4. The method for measuring linear displacement of a large-range moving platform of claim 1, characterized in that, an optical fiber beam splitter is used as the optical path distribution device (201), which is fixed on the moving platform (101) and generates the multiple beams of first measuring light (204) parallel to one another.

5. The method for measuring linear displacement of a large-range moving platform of claim 1, characterized in that, the minimal spacing among the array of detection headers (401) is calculated as follows: given that the minimal spacing between the adjacent detection headers (401) is t, the minimal spacing between the beams of first measuring lights (204) is p, then $t \leq p$.

* * * * *